(12) United States Patent
Tanaka et al.

(10) Patent No.: US 10,572,993 B2
(45) Date of Patent: Feb. 25, 2020

(54) INFORMATION PROCESSING APPARATUS, INFORMATION PROCESSING METHOD AND RECORDING MEDIUM

(71) Applicants: Takuya Tanaka, Tokyo (JP); Ryosuke Kasahara, Kanagawa (JP)

(72) Inventors: Takuya Tanaka, Tokyo (JP); Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 120 days.

(21) Appl. No.: 15/873,070

(22) Filed: Jan. 17, 2018

(65) Prior Publication Data

US 2018/0211374 A1     Jul. 26, 2018

(30) Foreign Application Priority Data

Jan. 23, 2017   (JP) .................................. 2017-009650

(51) Int. Cl.
*G06T 7/00*     (2017.01)
*G06K 9/66*     (2006.01)
(Continued)

(52) U.S. Cl.
CPC ............ *G06T 7/001* (2013.01); *G06K 9/6253* (2013.01); *G06K 9/6262* (2013.01);
(Continued)

(58) Field of Classification Search
CPC ........ G06T 7/001; G06K 9/66; G06K 9/6269; G06N 3/088
See application file for complete search history.

(56) References Cited

U.S. PATENT DOCUMENTS

2014/0235474 A1*   8/2014  Tang .................... C12Q 1/6869
                                                        506/9
2016/0127405 A1    5/2016  Kasahara
                      (Continued)

FOREIGN PATENT DOCUMENTS

JP        6-094643       4/1994
JP       11-344450      12/1999
                  (Continued)

OTHER PUBLICATIONS

Kim et al: "Non Referential Method for Defects Inspection of TFT-LCD Pad", SPIE, 2008 (Year: 2008).*
An English translation for JP H06-94643, 1994 (Year: 1994).*

*Primary Examiner* — Ruiping Li
(74) *Attorney, Agent, or Firm* — Harness, Dickey & Pierce, P.L.C.

(57) ABSTRACT

An information processing apparatus and method are disclosed, each of which: using a set of normal data, learns a first model for determining the normal data; sets, out of a plurality of abnormality candidate areas, the abnormality candidate areas selected by a user as correct data and the abnormality candidate areas not selected by the user as incorrect data, to learn a second model for identifying the correct data and the incorrect data, each abnormality candidate area indicating a candidate area of an abnormality and detected based on the first model from each of a plurality of captured images; obtains the captured images; detects the abnormality candidate areas from the respective captured images, using the first model; determines whether the abnormality candidate areas detected belong to the correct data or the incorrect data, using the second model; and controls to output a determination.

18 Claims, 4 Drawing Sheets

(51) Int. Cl.
*G06N 3/08* (2006.01)
*G06N 5/04* (2006.01)
*G06K 9/62* (2006.01)
*G06N 20/00* (2019.01)
*G06N 3/04* (2006.01)

(52) U.S. Cl.
CPC .............. *G06K 9/6269* (2013.01); *G06K 9/66* (2013.01); *G06N 3/088* (2013.01); *G06N 5/04* (2013.01); *G06N 20/00* (2019.01); *G06T 7/0004* (2013.01); *G06K 2209/19* (2013.01); *G06N 3/0454* (2013.01); *G06T 2207/20081* (2013.01)

(56) References Cited

U.S. PATENT DOCUMENTS

| | | |
|---|---|---|
| 2017/0004399 A1 | 1/2017 | Kasahara |
| 2017/0154234 A1 | 6/2017 | Tanaka et al. |
| 2017/0262974 A1 | 9/2017 | Kasahara |

FOREIGN PATENT DOCUMENTS

| | | |
|---|---|---|
| JP | 2003-005970 | 1/2003 |
| JP | 2005-265661 | 9/2005 |
| JP | 2005-293264 | 10/2005 |
| JP | 2017-167624 | 9/2017 |
| WO | WO2017/098601 A1 | 6/2017 |

\* cited by examiner

INFORMATION PROCESSING APPARATUS, INFORMATION PROCESSING METHOD AND RECORDING MEDIUM

CROSS-REFERENCE TO RELATED APPLICATIONS

This patent application is based on and claims priority pursuant to 35 U.S.C. § 119(a) to Japanese Patent Application No. 2017-009650, filed on Jan. 23, 2017, in the Japan Patent Office, the entire disclosure of which is hereby incorporated by reference herein.

BACKGROUND

Technical Field

The present invention relates to an information processing apparatus, an information processing method, and a recording medium.

Description of the Related Art

A machine learning algorithm is known, which determines a state of certain data. The machine learning can be widely applied, such as to determine whether or not a subject appearing in an image is a person, identify a scene appearing in an image, identify a sentence, identify audio, and the like.

The machine learning algorithm is also used to identify a material or to inspect a defect in the material. For example, a model (a model for determining data with no abnormality) is constructed with unsupervised learning using a set of data with no abnormality, and a degree of abnormality of each piece of data for sampling is calculated by using the constructed model, and data with a high degree of abnormality is labeled as mechanically abnormal. Then, a model (a model for identifying abnormal data and normal data) is constructed with supervised learning that uses the labeled data as abnormal data, and an abnormality of input data is detected by using the constructed model.

However, since all of the data with the high degree of abnormality are not necessarily defects to be detected, there is a possibility of erroneous detection of a portion that is statistically abnormal but is not a defect to be detected.

SUMMARY

Example embodiments of the present invention include an information processing apparatus and method, each of which: using a set of normal data, learns a first model for determining the normal data; sets, out of a plurality of abnormality candidate areas, the abnormality candidate areas selected by a user as correct data and the abnormality candidate areas not selected by the user as incorrect data, to learn a second model for identifying the correct data and the incorrect data, each abnormality candidate area indicating a candidate area of an abnormality and detected based on the first model from each of a plurality of captured images; obtains the captured images; detects the abnormality candidate areas from the respective captured images, using the first model; determines whether the abnormality candidate areas detected belong to the correct data or the incorrect data, using the second model; and controls to output a determination.

Embodiments of the present invention include a recording medium storing an information processing program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
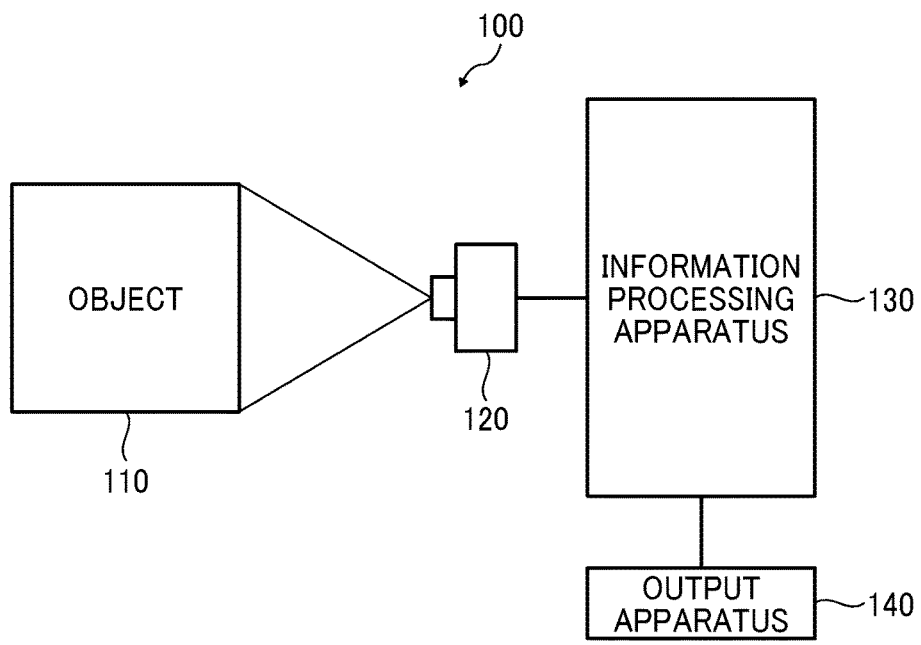
FIG. 1 is a diagram illustrating a schematic configuration of an information processing system, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an information processing apparatus, an information processing method, and a program according to the present invention will be described in detail referring to the accompanying drawings.

FIG. 1 is a diagram illustrating a schematic configuration of an information processing system 100 of a present embodiment. The information processing system 100 of FIG. 1 functions as an inspection system for inspecting an image. As illustrated in FIG. 1, the information processing system 100 includes a camera 120, an information processing apparatus 130, and an output apparatus 140. The camera 120 captures an object 110 to obtain an image. The information processing apparatus 130 obtains the image (in the following description, may be referred to as a "captured image") obtained by the camera 120. The information processing apparatus 130 uses the captured image to determine a state of the object 110 (determine presence or absence of an abnormal area), and transmits a determination result to the output apparatus 140. The output apparatus 140 outputs the determination result received from the information processing apparatus 130. A form of output is arbitrary, and the form may be audio output or image output.

In the example of FIG. 1, the information processing apparatus 130 is illustrated as being directly connected (wired connection) to the camera 120, but the present invention is not limited to this example. The information processing apparatus 130 and the camera 120 may be wirelessly connected to each other, for example. For example, the information processing apparatus 130 may be connected to the camera 120 via a network such as Ethernet (registered trademark), WiFi, LTE, 3G, or 4G. Further, for example, the camera 120 and the information processing apparatus 130 may be integrated into one apparatus. Similarly, the output apparatus 140 and the information processing apparatus 130 may be integrated into one apparatus.

Figure 2:
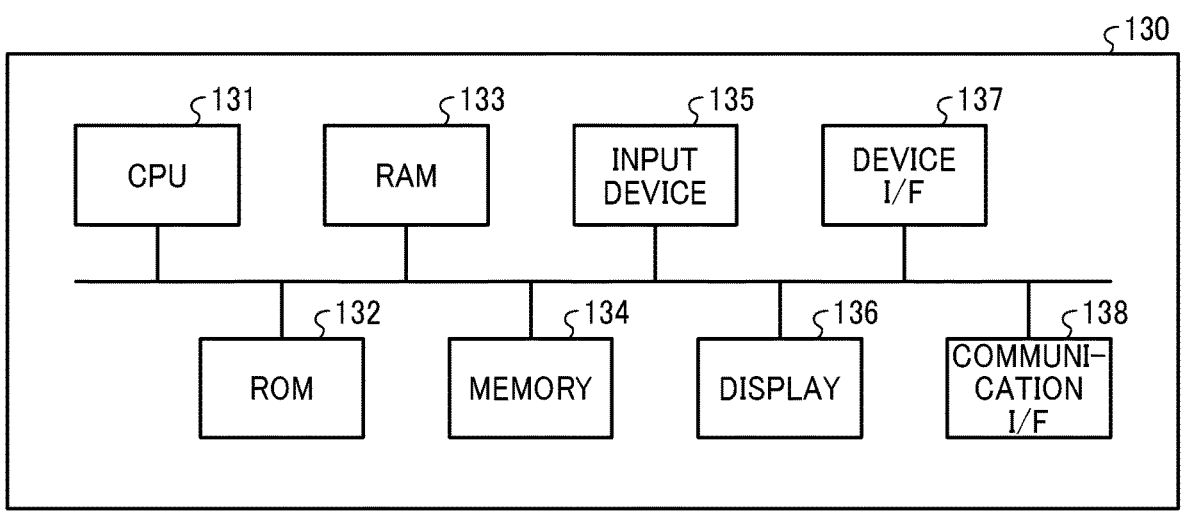
FIG. 2 is a diagram illustrating an example of a hardware configuration of an information processing apparatus.

FIG. 2 is a diagram illustrating an example of a hardware configuration of the information processing apparatus 130. The information processing apparatus 130 may be implemented as a personal computer, a workstation, or the like. As illustrated in FIG. 2, the information processing apparatus 130 includes a central processing unit (CPU) 131, a read-only memory (ROM) 132, a random access memory (RAM) 133, a memory 134, an input device 135, a display 136, a device interface (I/F) 137, and a communication I/F 138.

The CPU 131 controls entire operation of the information processing apparatus 130. The CPU 131 uses a predetermined area of the RAM 133 as a work area to execute a program stored in the ROM 132, the memory 134, or the like, and implements various functions of the information processing apparatus 130. Specific contents of the functions of the information processing apparatus 130 will be described later.

The ROM 132 is a non-volatile memory (non-rewritable memory) for storing the program, various setting information, and the like related to the information processing apparatus 130.

The RAM 133 is a storage device such as synchronous dynamic random access memory (SDRAM), and functions as the work area of the CPU 131 or a buffer memory, etc.

The memory 134 is an auxiliary storage device such as a hard disk drive (HDD). The input device 135 accepts operation by a user, and may be implemented by a keyboard, a mouse, touch panel, etc. The display 136 displays various types of information relating to the information processing apparatus 130, and includes a liquid crystal display, for example.

The device I/F 137 is an interface for connecting the information processing apparatus 130 to the camera 120 and the output apparatus 140, for example. The communication I/F 138 is an interface for connecting the information processing apparatus 130 with a network such as the Internet. For example, instead of the device I/F 137, the information processing apparatus 130 may be connected to the camera 120 and the output apparatus 140 via the communication I/F 138.

Figure 3:
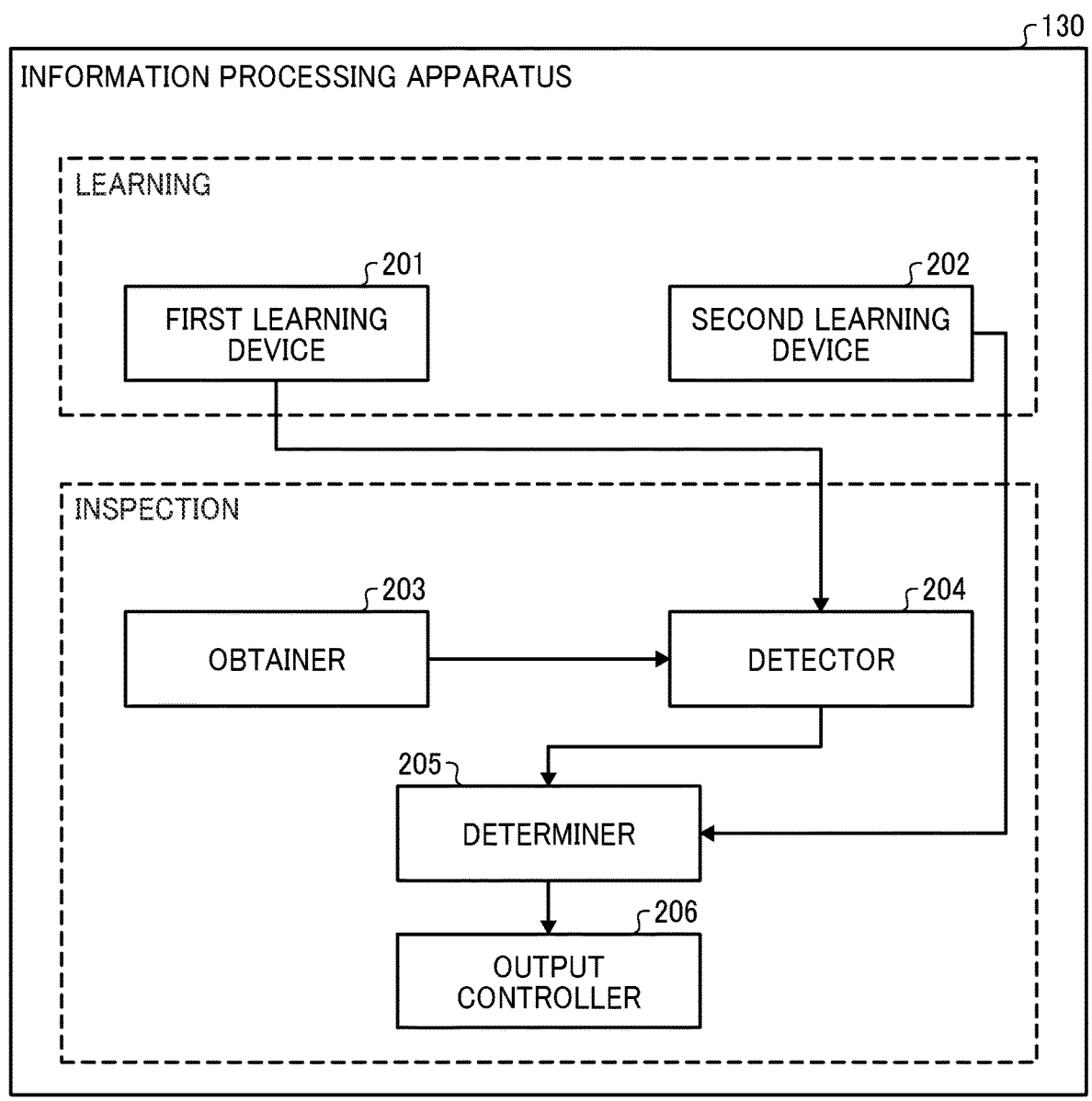
FIG. 3 is a diagram illustrating an example of functions of the information processing apparatus, according to an embodiment.

FIG. 3 is a diagram illustrating an example of functions of the information processing apparatus 130. As illustrated in FIG. 3, the information processing apparatus 130 includes a first learning device 201, a second learning device 202, an obtainer 203, a detector 204, a determiner 205, and an output controller 206. Here, description will be made assuming that the first learning device 201 and the second learning device 202 are functions that operate during learning, and the obtainer 203, the detector 204, the determiner 205, and the output controller 206 are functions that operate during inspection. For convenience of description, in the example of FIG. 3, the functions relating to the present embodiment are mainly illustrated, but the functions of the information processing apparatus 130 are not limited to the example.

The first learning device 201 learns a first model for determining the normal data using a set of normal data. In this example, the first learning device 201 uses a set of non-defective images (examples of normal data) each indicating a captured image obtained by capturing an object with no defect out of captured images obtained by capturing respective objects, to learn the first model for determining the non-defective image. More specifically, the first learning device 201 learns the first model with unsupervised learning. The first model has a pixel mean value indicating a mean of pixel values and a pixel variance value indicating a variance of the pixel values as parameters, for each pixel of the non-defective image. In this example, for example, similarly to a method disclosed in JP-2005-265661-A, the first learning device 201 accepts input of a plurality of non-defective images, and for each corresponding pixel, obtains the pixel mean value and the pixel variance value and stores the values as parameters (constructs (learns) the first model).

A method for learning the first model with the unsupervised learning is arbitrary. For example, the first learning device 201 may accept input of the plurality of non-defective images, and apply a plurality of different spatial filter groups to each non-defective image, to generate filter images for the number of non-defective images for each of the plurality of spatial filters, and then, for each of the plurality of spatial filters, obtain the pixel mean value and the pixel variance value of each pixel of the corresponding plurality of filtered images (filtered images for the number of non-defective images), and store the values as parameters (construct (learn) the first model). Even this form is included in a concept that the first model has the pixel mean value indicating the mean of the pixel values and the pixel variance value indicating the variance of the pixel values as the parameters, for each pixel of the non-defective image.

The first learning device 201 may learn the first model with semi-supervised learning. The semi-supervised learning is a method for performing model learning assuming that input data belongs to a specific one class. For example, the first learning device 201 can learn the first model using a One Class Support Vector Machine (SVM). In a form using the One Class SVM, in a case where a few defects are included during learning, more appropriate model learning becomes possible by specifying a ratio of the defects. In addition, the first learning device 201 can adapt not only to the captured image obtained by capturing the object but also to a case of moving image data (for example, a moving image by a monitoring camera) or multidimensional time-series data (for example, an electroencephalogram). In a case of the moving image, processing on a frame-by-frame basis is the same as a case of the captured image obtained by capturing the object, and the first learning device 201 can be implemented by using a spatio-temporal feature that is a feature value for the moving data, or by extracting a feature value with moving image feature value extraction with a convolution neural network (CNN) or Recurrent Neural Network (RNN), and using a semi-supervised abnormality detection method described above. In a case of the multi-dimensional time-series data, the first learning device 201 can be implemented by using a time-series feature value (such as a frequency feature value, known) or extracting a feature value with multidimensional time-series data extraction (known) with the CNN or RNN, and using the semi-supervised abnormality detection method described above.

Next, the second learning device 202 will be described. The second learning device 202 sets, out of a plurality of abnormality candidate areas each indicating a candidate area of an abnormality and detected on the basis of the first model from each of a plurality of captured images prepared in advance (in the following description, the captured images may be referred to as a sample image set), the abnormality candidate areas selected by a user as correct data and the abnormality candidate areas not selected by the user as incorrect data, to learn a second model for identifying the correct data and the incorrect data. Here, a defect will be described as an example of an abnormality, and each of the abnormality candidate areas is a defect candidate area indicating a candidate area of a defect. The sample image set includes not only a non-defective image but also a captured image (defect image) obtained by capturing an object having a defect, and the second learning device 202 uses the first model learned by the first learning device 201, to detect the defect candidate area from each of the plurality of captured images (sample image set) prepared in advance. In this example, the second learning device 202 can calculate a Z-score indicating a value depending on difference from the parameters of the first model described above for each pixel of the plurality of captured images prepared in advance, to detect an aggregation area of pixels each indicating a Z-score equal to or greater than a predetermined threshold value, as the defect candidate area. Here, the Z-score can be calculated by equation 1 below. In equation 1, Z(x, y) represents a Z-score of a pixel (x, y) of an arbitrary captured image (input image) I, and I(x, y) represents a pixel value of the pixel (x, y) of the input image I. In addition, μ(x, y) and σ(x, y) are parameters of the pixel (x, y) (parameters of the first model described above), and μ(x, y) represents a pixel mean value indicating a mean of the pixels (x, y) of the respective non-defective images, and σ(x, y) represents a pixel variance value indicating a variance of the pixels (x, y) of the respective non-defective images.

$$Z(x,y)=|I(x,y)-\mu(x,y)|/\sqrt{\sigma^2(x,y)} \qquad \text{[Mathematical Equation 1]}$$

Here, the second learning device 202 has a function of using the learned first model to detect the defect candidate area; however, not limited to the function, for example, the detector 204 described later may use the learned first model to detect the defect candidate area, and transfer the defect candidate area detected to the second learning device 202.

Figure 4:
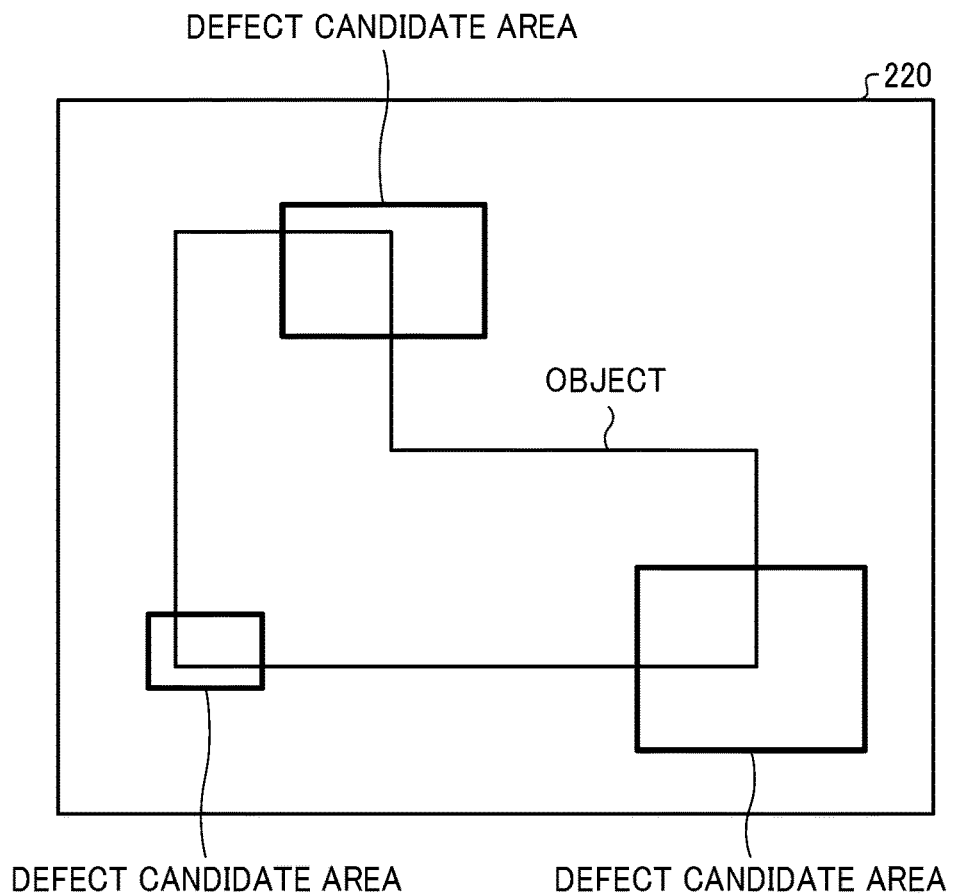
FIG. 4 is a diagram illustrating an example of defect candidate area presentation screen.

In this example, as illustrated in FIG. 4, the second learning device 202 performs control for displaying on a display 136 a screen 220 (defect candidate area presentation screen 220) for displaying the defect candidate area detected on the basis of the first model in the object, and accepts selection of the defect candidate area. In this example, the defect candidate area selected by the user is labeled to be indicated as a defect, and the defect candidate area labeled becomes correct data to be detected as an abnormal area. A method for selecting the defect candidate area is arbitrary. For example, the defect candidate area may be selected by touching the defect candidate area on the defect candidate area presentation screen 220, or a mouse may be operated to select the defect candidate area such that a cursor moving in accordance with mouse operation overlaps with the defect candidate area and the defect candidate area is selected by clicking the mouse. For example, the function of performing control for displaying on the display 136 the defect candidate area presentation screen 220 described above and accepting selection of the defect candidate area may be provided separately from the second learning device 202, and a result of labeling (a set of defect candidate areas labeled, and a set of defect candidate areas not labeled) may be transferred to the second learning device 202.

A type of label may be one type as an abnormality, or may be plural types. For example, in a case where post processing is necessary such that the object is discarded in a case where the abnormality is a "scratch" and deburring is performed in a case where the abnormality is a "burr", even if abnormality detection is successful with the one type as the abnormality, it is unknown what kind of response should be made afterwards. In such a case, it is possible to set the scratch as an abnormal A class, and the burr as an abnormal B class. As a result, the second learning device 202 can be applied even in a case where the responses differ depending on the type of the abnormality detected. That is, the second learning device 202 can accept a plurality of category inputs of the correct data.

The second learning device 202 sets the defect candidate area (labeled data) labeled (selected by the user) as described above as the correct data, and the defect candidate area not labeled (not selected by the user) as the incorrect data, to learn the second model for identifying the correct data and the incorrect data. Here, the second learning device 202 learns the second model with supervised learning. For example, the second learning device 202 can learn the second model with any of the linear determination, logistic regression, SVM, neural network, K-nearest neighbor method, decision tree, and deep learning (in which well-known various techniques can be used). In addition, the second learning device 202 can learn not only two class classification of the correct data and the incorrect data, but also a case of more than three classes. In that case, the second learning device 202 can be implemented by using a method capable of multi-class classification of three or more classes (known methods, such as the neural network, K-nearest neighbor method, multi-class SVM, and deep learning).

As described above, by operation of each of the first learning device 201 and the second learning device 202 during learning, the first model described above and the second model described above are learned (constructed) in advance.

Next, referring to FIG. 3, functions that operate during inspection will be described. The obtainer 203 obtains the captured image (captured image obtained by capturing the object) from the camera 120. The detector 204 uses the first model described above to detect the defect candidate area from the captured image obtained by the obtainer 203. In this example, the detector 204 calculates the Z-score indicating the value depending on the difference from the parameters of the first model described above, for each pixel of the captured image obtained by the obtainer 203, to detect the defect candidate area based on the Z-score calculated. Here, the Z-score can be obtained by equation 1 described above.

The determiner 205 uses the second model described above to determine whether the defect candidate area detected by the detector 204 belongs to the correct data or the incorrect data. Various known techniques can be used as a method that uses an identification model (second model) for identifying a defect (correct data) and a non-defect (incorrect data), to determine whether input data (defect candidate area detected by the detector 204) is the defect or the non-defect.

The output controller 206 performs control to output a determination result by the determiner 205. In this example, the output controller 206 performs control to notify the output apparatus 140 of the determination result by the determiner 205. The output apparatus 140 receiving this notification outputs information for notification of an abnormal area (area determined as a defect) (the information may be audio information or image information).

Figure 5:
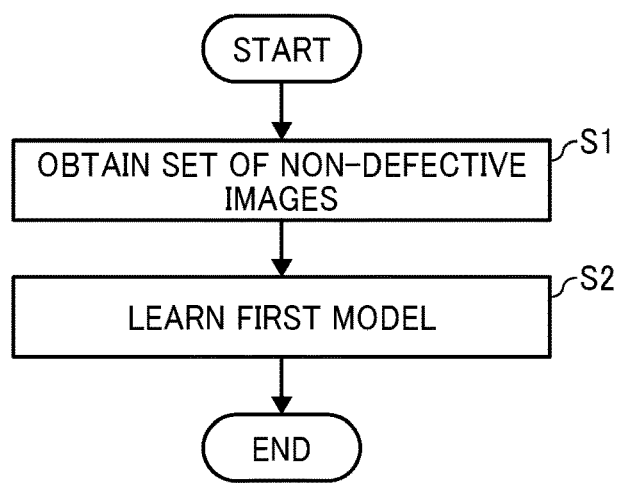
FIG. 5 is a flowchart illustrating an example operation performed by a first learning device.

FIG. 5 is a flowchart illustrating an example operation performed by the first learning device 201. Since specific contents of each step are as described above, detailed description will be omitted. As illustrated in FIG. 5, the first learning device 201 obtains a set of non-defective images (step S1). For example, the set of non-defective images obtained by capturing respective non-defective objects in advance may be stored in memory 134, and the first learning device 201 may obtain the set of non-defective images from the memory 134. Next, the first learning device 201 uses the set of non-defective images obtained in step S1, to learn the first model described above for determining the non-defective image (step S2).

Figure 6:
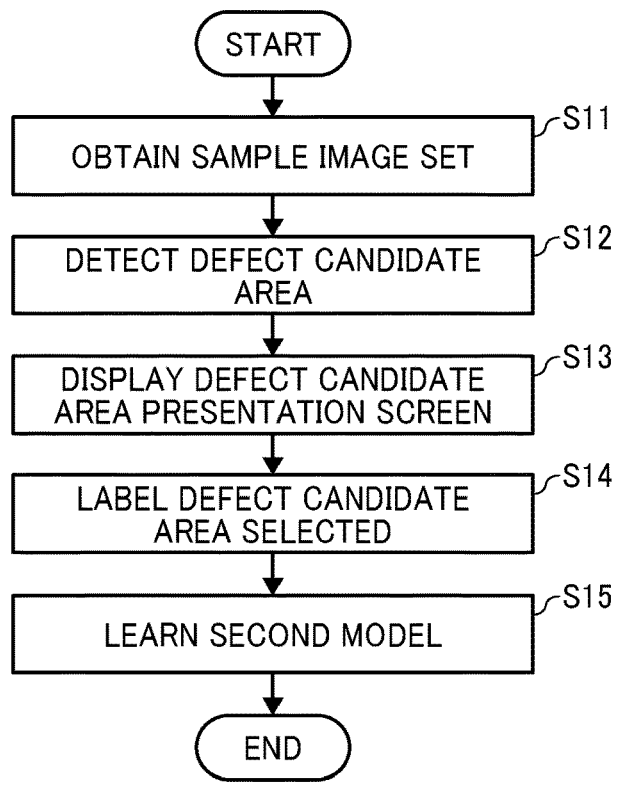
FIG. 6 is a flowchart illustrating an example operation performed by a second learning device.

FIG. 6 is a flowchart illustrating an example operation performed by the second learning device 202. Since specific contents of each step are as described above, detailed description will be omitted. As illustrated in FIG. 6, the second learning device 202 obtains the sample image set (step S11). For example, the sample image set may be stored in the memory 134, and the second learning device 202 may obtain the sample image set from the memory 134. Next, the second learning device 202 uses the first model described above to detect the defect candidate area from the sample image set (step S12). Next, the second learning device 202 displays the defect candidate area presentation screen 220 described above (step S13). Then, the second learning device 202 labels the defect candidate area selected from the defect candidate area presentation screen 220 (step S14). Next, the second learning device 202 learns the second model described above for identifying the defect candidate area labeled and the defect candidate area not labeled (step S15).

Figure 7:
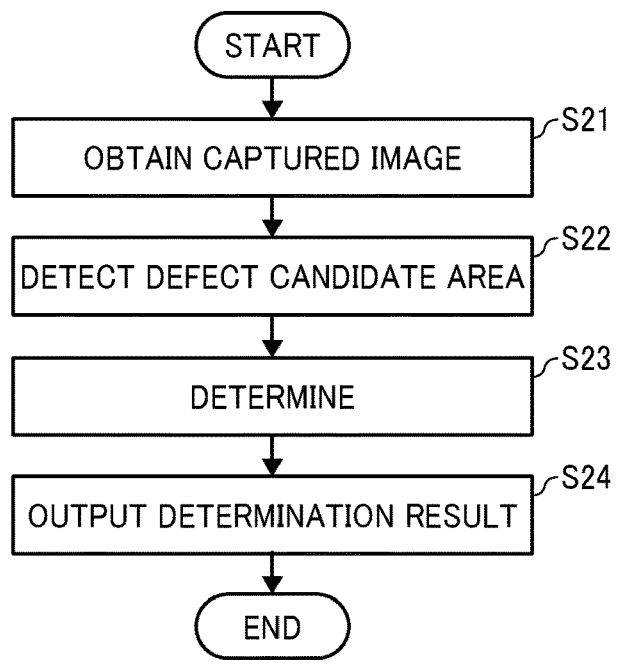
FIG. 7 is a flowchart illustrating an example operation of inspecting, performed by the information processing apparatus.

FIG. 7 is a flowchart illustrating an example operation of inspecting performed by the information processing apparatus 130. Since specific contents of each step are as described above, detailed description will be omitted. As illustrated in FIG. 7, the obtainer 203 obtains the captured image from the camera 120 (step S21). Next, the detector 204 uses the first model described above to detect the defect candidate area from the captured image obtained in step S21 (step S22). Next, the determiner 205 uses the second model described above to determine whether or not the defect candidate area is a defect for each of one or more defect candidate areas detected in step S22 (step S23). Next, the output controller 206 performs control to output the determination result in step S23 (step S24).

As described above, in the present embodiment, using the set of non-defective images, the first model for determining the non-defective image is learned. Out of the plurality of defect candidate areas detected on the basis of the first model described above from the sample image set prepared in advance, the defect candidate area selected by the user is set as the correct data and the defect candidate area not selected by the user is set as the incorrect data, and the second model for identifying the correct data and the incorrect data is learned in advance. In an inspection stage, with the learned first model, the defect candidate area is detected from the captured image obtained by capturing the object. Then, with the learned second model, it is determined whether or not the defect candidate area detected is a defect. In the present embodiment, the first model and the second model described above are used, and presence or absence of the abnormal area in the captured image is determined. This suppress erroneous detection of a portion that is statistically abnormal but is not a defect to be detected. Accordingly, sufficient inspection accuracy can be obtained.

Second Embodiment

Next, a second embodiment will be described. Descriptions of portions common to the first embodiment described above will be omitted as appropriate.

Performance of the second model described above is closely related to the number of labeled data, and in a case where the number of labeled data is small (generally, 1000 or less, although it cannot be said unconditionally because the number depends on the object and required identification accuracy), there is a high possibility that the performance of the second model described above is insufficient. Thus, in the present embodiment, the determiner 205 adopts the determination result only in a case where a certainty factor is high of the determination result using the second model described above. For example, in a case where the second model described above is a model constructed with the convolution neural network (CNN) that is an example of the deep learning, a certainty factor of (0, 1) is output indicating whether input data (defect candidate area detected by using the first model) is a defect or a non-defect. Generally, the half, 0.5, is set as the identification boundary of the non-defect or the defect. In a case where the performance of the second model is insufficient (in a case where the second model is constructed with a small number of labeled data), a method can be considered of adopting the determination result using the second model described above only in a case where the certainty factor is equal to or greater than a threshold value, for example, the data is determined as being non-defect only in a case where the certainty factor of the non-defect is equal to or greater than the threshold value (for example, 0.8). The identification boundary (threshold value) can be adjusted by searching for a value with the best performance using labeled data already stored. The same applies to other methods.

Third Embodiment

Next, a third embodiment will be described. Descriptions of portions common to the first embodiment described above will be omitted as appropriate.

Abnormality detection (detection of the defect candidate area) using the first model described above (model constructed with the unsupervised learning) detects an area that is not a defect desired to be detected by the user (defect to be detected) but is statistically abnormal, due to a property of finding a statistically abnormal value, so that erroneous detection tends to be unavoidable. In addition, in a case where the statistically abnormal value is low of the defect desired to be detected by the user, it is necessary to lower the threshold value to detect the defect, and a certain erroneous detection occurs. Generally, in the supervised learning, performance increases as the number of labeled data increases, so that a case can be considered where the performance becomes higher in inspection with a model constructed with the supervised learning alone than in inspection with a combination of the first model and the second model.

Thus, in the present embodiment, in a case where the number of labeled data exceeds a threshold value, modification is performed such that presence or absence of the defect area is determined with the second model alone. That is, in a case where the second model is constructed with the number of labeled data exceeding the threshold value, the determiner 205 does not use the first model described above, but uses the second model to determine the abnormal area in an input captured image. In this case, the abnormality detection can be implemented by using a sliding window for directly inputting the captured image (inspection image) obtained by the obtainer 203, selective search, or the like, to extract the defect candidate area in advance, and inputting the defect candidate area extracted to the second model.

In the above, the embodiments according to the present invention have been described; however, the present invention is not limited to the above-described embodiments, and in the implementation stage, the constituent elements can be modified and embodied without departing from the gist of the invention. In addition, various inventions can be formed by appropriately combining the constituent elements disclosed in the above-described embodiments. For example, some constituent elements may be removed from all the constituent elements described in the embodiment. Further, different embodiments and modifications may be appropriately combined.

The program executed by the information processing system 100 according to the embodiment described above may be stored in a computer-readable recording medium such as a CD-ROM, a flexible disk (FD), a CD-R, a digital versatile disk (DVD), a universal serial bus (USB) memory device, or may be provided or distributed via a network such as the Internet. In addition, various programs may be provided by being incorporated in ROM or the like in advance.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising:
    circuitry configured to cause the information processing apparatus to, learn a first model for determining normal data based on a set of the normal data,
    create a sample data set by,
        detecting a plurality of abnormality candidate areas based on the first model from each of a plurality of sample captured images,
        prompting a user to select, out of the plurality of abnormality candidate areas, abnormality candidate areas representing correct data, and
        setting the plurality of abnormality candidate areas selected by the user as correct data, and the plurality of abnormality candidate areas not selected by the user as incorrect data,
    learn a second model for identifying the correct data and the incorrect data, based on the sample data set,
    obtain captured images,
    detect the abnormality candidate areas from the respective captured images, using the first model,
    determine whether the abnormality candidate areas detected belong to the correct data or the incorrect data, using the second model, and
    output the determination.

2. The information processing apparatus according to claim 1, wherein the circuitry is further configured to cause the information processing apparatus to,
    learn the first model with unsupervised learning.

3. The information processing apparatus according to claim 2, wherein the circuitry is further configured to cause the information processing apparatus to,
    learn the first model by obtaining a pixel mean value indicating a mean of pixel values and a pixel variance value indicating a variance of the pixel values as parameters, for each pixel of a non-defective image.

4. The information processing apparatus according to claim 1, wherein the circuitry is further configured to cause the information processing apparatus to,
    learn the first model with semi-supervised learning.

5. The information processing apparatus according to claim 4, wherein the circuitry is further configured to cause the information processing apparatus to,
    learn the first model with a One Class SVM.

6. The information processing apparatus according to claim 1, wherein the circuitry is further configured to cause the information processing apparatus to,
    learn the second model with supervised learning.

7. The information processing apparatus according to claim 6, wherein the circuitry is further configured to cause the information processing apparatus to,
    learn the second model with any of linear determination, logistic regression, a SVM, a neural network, a K-nearest neighbor method, a decision tree, and deep learning, or a combination thereof.

8. The information processing apparatus according to claim 1, wherein the circuitry is further configured to cause the information processing apparatus to,
    accept a plurality of category inputs of the correct data.

9. The information processing apparatus according to claim 1, wherein the circuitry is further configured to cause the information processing apparatus to,
    determine whether the abnormality candidate areas detected belong to the correct data or the incorrect data, using the second model, and based on a certainty factor.

10. An information processing method comprising:
    learning a first model for determining normal data, based on a set of the normal data;
    creating a sample data set by,
        detecting a plurality of abnormality candidate areas based on the first model from each of a plurality of sample captured images,
        prompting a user to select, out of the plurality of abnormality candidate areas, abnormality candidate areas representing correct data, and
        setting the plurality of abnormality candidate areas selected by the user as correct data, and the plurality of abnormality candidate areas not selected by the user as incorrect data;
    learning a second model for identifying the correct data and the incorrect data, based on the sample data set;
    obtaining the captured images;
    detecting the abnormality candidate areas from the respective captured images, using the first model;
    determining whether the abnormality candidate areas detected belong to the correct data or the incorrect data, using the second model; and
    outputting the determination.

11. A non-transitory recording medium which, when executed by one or more processors, cause the processors to perform an information processing method comprising:
    learning a first model for determining normal data, based on a set of normal data;
    creating a sample data set by, detecting a plurality of abnormality candidate areas based on the first model from each of a plurality of sample captured images, prompting a user to select, out of the plurality of abnormality candidate areas, abnormality candidate areas representing correct data, and setting the plurality of abnormality candidate areas selected by the user as correct data, and the plurality of abnormality candidate areas not selected by the user as incorrect data;

learning a second model for identifying the correct data and the incorrect data, based on the sample data set;

obtaining captured images;

detecting the abnormality candidate areas from the respective captured images, using the first model;

determining whether the abnormality candidate areas detected belong to the correct data or the incorrect data, using the second model; and outputting the determination.

12. The information processing apparatus according to claim 3, wherein the circuitry is further configured to, calculate a Z-score indicating a value depending on a difference from the parameters, for each pixel of the captured images obtained, and detect the abnormality candidate areas based on the Z-score calculated.

13. The information processing apparatus according to claim 1, wherein the set of the normal data includes moving image data or multidemensional time-series data.

14. The method of claim 10, wherein the learning the first model includes learning the first model with unsupervised learning.

15. The method of claim 10, wherein the learning the first model further includes, obtaining a pixel mean value indicating a mean of pixel values and a pixel variance value indicating a variance of the pixel values as parameters, for each pixel of a non-defective image.

16. The method of claim 15, wherein the learning the first model further includes, calculating a Z-score indicating a value depending on a difference from the parameters, for each pixel of the captured images obtained, and detecting the abnormality candidate areas based on the Z-score calculated.

17. The method of claim 10, wherein the learning the first model further includes, learning the first model with semi-supervised learning.

18. The method of claim 17, wherein the learning the first model further includes, learning the first model with a One Class SVM.

* * * * *